Patented Oct. 20, 1931

1,828,292

UNITED STATES PATENT OFFICE

BRYAN B. PAUL, OF WILKINSBURG, PENNSYLVANIA, ASSIGNOR TO WESTINGHOUSE ELECTRIC & MANUFACTURING COMPANY, A CORPORATION OF PENNSYLVANIA

INSULATING MATERIAL AND PROCESS OF MAKING THE SAME

No Drawing.   Application filed May 19, 1928. Serial No. 279,208.

My invention relates to insulating materials and it has particular relation to moldable materials that are highly resistant to heat.

An object of my invention is to provide a strong, moldable, arc-resistant, heat-resistant, slate-like machinable composition which shall be low in cost with respect to both material and manufacture.

Other objects of my invention will become apparent from the following description.

In the art of providing a cold-molded, arc-resistant material, it has been found that a slate-like material is very desirable, but materials of the prior art have been found not to be entirely satisfactory. My invention provides an improved material which may be highly polished and which lends itself readily to the extrusion process. The material so produced is strong, may be readily machined and is highly resistant to arcing.

My improved insulating material comprises powdered slate, hydrated lime, and if desired, a fibrous filler, such as asbestos. The proportions of the ingredients embodied in my material may be varied over a considerable range, from 7 parts by weight, of hydrated lime, with 93 parts, by weight, of powdered slate to 71 parts of hydrated lime with 29 parts of powdered slate. The percentage of asbestos or other filler may be varied over a wide range, but a preferred form of my invention comprises

| | Parts by weight |
|---|---|
| Powdered slate | 71 |
| Hydrated lime | 29 |
| Asbestos | 43 |

In practicing my invention, the materials are mixed thoroughly, it being, of course, understood that the powdered slate and hydrated lime are in a finely-divided state, in order that a close bonding of the ingredients may be secured. The powdered slate and hydrated lime constitute the binder material, while the asbestos acts merely as a filler material and may be omitted, if desired, or may be replaced by mineral wool or the like. The proportions of ingredients may be widely varied but will be governed by the use for which the material is intended and the strength and toughness required.

The ingredients, after they are thoroughly mixed, are moistened with water and molded or extruded in the desired shape, under pressure sufficient to give a highly compressed dense body. The body is dried and then placed in a closed chamber and treated with steam, under pressure. Various steam pressures may be employed, and the length of time during which the treatment should continue depends more or less on the pressure utilized and the size of the objects treated; for instance, for small articles, a pressure of approximately 150 pounds per square inch, continued for five hours, has been found satisfactory. The temperature, at this pressure is about 186° C.

The powdered slate and hydrated lime are readily combined by the above-described process without the use of any fluxing agent and without utilizing any salt or compound other than those described. The slate colors the mass so that the material is so dark as to very closely resemble natural slate.

Almost any ordinary slate may be used. A representative slate composition is:

| | |
|---|---|
| Mica | 28 to 40% |
| Chlorite | 16 to 18% |
| Quartz | 31 to 45% |
| Hematite | 3 to 5% |
| Rutile | 1 to 1.5% |

Another representative composition is:

| | Per cent |
|---|---|
| Silica | 54 |
| Alumina | 13 |
| Iron oxide | 11 |
| Lime | 1 |
| Magnesia | 17 |
| Water | 4 |

The asbestos in the compound is not entirely necessary and slag wool or like filling material may replace the asbestos or the filler materials may be eliminated entirely. Other alkali-earth-metal hydroxides may be utilized in place of hydrated lime, and magnesium, while not always classified as an alkali-earth metal, is, for my purpose, equivalent thereto. Also two or more alkali-earth-metal hydroxides may be used in combination. Therefore, it will be understood that, in the specification and claims, where an alkali-earth-metal hydroxide is mentioned, magnesium hydroxide is also included.

The resulting material is strong, arc-resistant and may readily be molded, machined or extruded.

The ingredients are low in cost and, therefore, a low-priced material is produced. The material may be given a high polish, and the extruding process itself produces a high polish. The material is arc-resistant and has a coloring very much resembling natural slate.

Although I have described a specific modification of my invention, the process may be varied over a considerable range and, therefore, I do not wish to be limited to the specific modification described, since other modifications may be made by those skilled in the art without departing from the spirit and scope of my invention, as defined in the appended claims.

I claim as my invention:

1. As a composition of matter, a dense slate-like material comprising the reaction product of from 7 to 71 parts of an alkaline-earth-metal hydroxide and 29 to 93 parts of powdered slate formed by steam treatment under pressure.

2. As a composition of matter, a dense slate-like material comprising a filler and the reaction product of from 7 to 71 parts of an alkaline-earth-metal hydroxide and 93 to 29 parts of powdered slate formed by steam treatment under pressure, the reaction product of the hydrated lime and powdered slate serving as a binder for the filler.

3. As a composition of matter, a dense slate-like insulating material comprising asbestos and the reaction product of from 7 to 71 parts of hydrated lime and 93 to 29 parts of powdered slate formed by steam treatment under pressure, the reaction product of the lime and powdered slate serving as a binder for the asbestos.

4. The process of producing a dense slate-like material which comprises mixing powdered slate and an alkaline-earth-metal hydroxide together, moistening with water, forming the mass into the desired shape and then treating with steam under sufficient pressure to cause at least a partial reaction between the ingredients.

5. The process of producing a dense slate-like material which comprises mixing together from 7 to 71 parts of an alkaline-earth-metal hydroxide and from 93 to 29 parts of powdered slate and molding the material in the presence of steam under sufficient pressure to cause a partial reaction between the ingredients.

6. The process of producing a dense slate-like insulating material which comprises mixing a filler, an alkaline-earth-metal hydroxide and powdered slate together and molding the mixture in the presence of steam under sufficient pressure to cause a reaction between the alkaline-earth-metal hydroxide and at least part of the ingredients of the powdered slate so as to form a binding agent for the filler.

7. The process of producing a dense slate-like insulating material which comprises mixing asbestos with from 7 to 71 parts of hydrated lime and 93 to 29 parts of powdered slate, moistening with water, forming into the desired shape and then molding the material in the presence of steam under sufficient pressure to cause at least a partial chemical reaction between the hydrated lime and the ingredients of the slate, thereby forming a binder for the asbestos.

In testimony whereof, I have hereunto subscribed my name this 14th day of May 1928.

BRYAN B. PAUL.